US008202359B2

(12) United States Patent
Katano et al.

(10) Patent No.: US 8,202,359 B2
(45) Date of Patent: Jun. 19, 2012

(54) IMAGE QUALITY IMPROVEMENT TREATMENT LIQUID, IMAGE QUALITY IMPROVEMENT PROCESSING METHOD, IMAGE FORMING METHOD, AND IMAGE FORMING APPARATUS

(75) Inventors: Yasuo Katano, Kanagawa (JP); Tomoaki Sugawara, Kanagawa (JP); Minori Ichimura, Tokyo (JP); Manabu Izumikawa, Tokyo (JP); Kazuyoshi Matsumoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 544 days.

(21) Appl. No.: 12/419,432

(22) Filed: Apr. 7, 2009

(65) Prior Publication Data

US 2009/0263584 A1 Oct. 22, 2009

(30) Foreign Application Priority Data

Apr. 22, 2008 (JP) ................................ 2008-110890

(51) Int. Cl.

| | |
|---|---|
| ***C09D 5/00*** | (2006.01) |
| ***C09D 191/00*** | (2006.01) |
| ***B05D 3/10*** | (2006.01) |
| ***B05D 1/36*** | (2006.01) |
| ***B41J 2/01*** | (2006.01) |

(52) U.S. Cl. ............ 106/243; 427/301; 118/46; 347/96

(58) Field of Classification Search .................. 106/243; 427/301; 118/46; 347/96

See application file for complete search history.

(56) References Cited

U.S. PATENT DOCUMENTS

| | | | | |
|---|---|---|---|---|
| 7,033,013 | B2 * | 4/2006 | Koyano et al. | 347/100 |
| 8,076,394 | B2 * | 12/2011 | Kabalnov | 523/160 |

FOREIGN PATENT DOCUMENTS

| | | | |
|---|---|---|---|
| EP | 1 400 364 | A1 | 3/2004 |
| JP | 64-9279 | | 1/1989 |
| JP | 2001-301138 | | 10/2001 |
| JP | 2006-45522 | | 2/2006 |
| JP | 2006-205465 | | 8/2006 |
| WO | WO 99/64249 | | 12/1999 |
| WO | WO 03/074191 | A1 | 9/2003 |
| WO | WO 2009/035137 | A1 | 3/2009 |

OTHER PUBLICATIONS

Office Action issued Feb. 7, 2011, in European Patent Application No. 09 155 945.0-2304.

* cited by examiner

*Primary Examiner* — David M Brunsman

(74) *Attorney, Agent, or Firm* — Oblon, Spivak, McClelland, Maier & Neustadt, L.L.P.

(57) ABSTRACT

An image quality improvement treatment liquid is disclosed that improves quality of an image formed on a medium by reacting with color materials in ink and agglutinating the color materials upon contact with the ink including water and color materials to be ionized in water or color materials to be ionized in water due to absorption with components having ionic characteristics in water. The image quality improvement treatment liquid includes at least one of cationic components and components capable of acidizing water, at least one of nonionic surfactant and amphoteric surfactant as a foaming agent, and water-insoluble fatty acid.

9 Claims, 14 Drawing Sheets

IMAGE QUALITY IMPROVEMENT TREATMENT LIQUID, IMAGE QUALITY IMPROVEMENT PROCESSING METHOD, IMAGE FORMING METHOD, AND IMAGE FORMING APPARATUS

CROSS-REFERENCE TO RELATED APPLICATIONS

The present application claims priority under 35 U.S.C §119 to Japanese Patent Application Publication No. 2008-110890 filed Apr. 22, 2008, the entire contents of which are hereby incorporated herein by reference.

BACKGROUND OF THE INVENTION

1. Field of the Invention

The present invention generally relates to an image quality improvement treatment liquid, an image quality improvement processing method, an image forming method, and an image forming apparatus. More particularly, the present invention relates to a technique of improving image quality by preventing color bleeding and feathering occurring on a recording medium in a method or apparatus where an image in accordance with image information is formed on the recording medium such as a sheet using ink droplets from an inkjet.

2. Description of the Related Art

In an inkjet recording technique, ink is split into ink droplets by passing the ink through small (spray) nozzles and ejecting onto a recording medium like a sheet by using methods such as a pressure-on-demand method or a charge control method. Such a technique is preferably used in various image forming apparatuses such as printers, facsimile machines, and copiers. The inkjet recording techniques are expected to be further developed as the image recording methods for recoding images onto recording media because ink is directly ejected onto a recording medium, which makes it possible to reduce the size of the apparatus and manufacture the apparatus more easily as well when compared with a technique such as an electrophotographic recording technique which is an indirect printing type technique employed in an apparatus using a photosensitive body.

Next, an inkjet recording technique is described with reference to the accompanying figures. As shown in FIGS. 1A and 1B, when an ink droplet 63 including vehicle liquid 61 having water as its main component and color materials 62 including pigment and dye and dispersed in the vehicle liquid 61 as shown in FIG. 1A is ejected from an inkjet head and applied to a medium 64 such as non-coated paper like high-quality paper and coarse paper as shown in FIG. 1B, the vehicle liquid 61 and the color materials 62 penetrate along the direction of the pulp fibers (not shown) of the medium (sheet) 64. Because of the penetration along the direction of the pulp fibers on the surface of the sheet, the ink flows sideways to form a jagged shaped ink dot called "feathering". Further, in forming a color image, after a first-color droplet layer is formed on a sheet, second-color droplets are ejected on the first-color droplet layer that is not yet dried on the sheet, causing the shape of the second-color droplet to be deformed and resulting in the ink flowing on the surface of the sheet, thereby generating bleeding of the ink called "color bleeding". Further, most of the color materials 62 may penetrate inside the sheet, which may reduce the density of the image on the surface of the sheet and increase the density on the back side of the sheet, this phenomenon may be called "strike through of image". Further, when an ink droplet is in contact with any other ink droplet on the surface of the sheet before penetrating inside the sheet, those ink droplets may be combined to form a dot which may become more than two times as large as normal dots called "beading" and appear granular. Namely, as described above, the ink droplets applied to the surface of a recording medium such as a sheet and a resin film may penetrate to the back side of the medium (the strike though), attach to the back side of another sheet (called "setoff") when continuous printing is performed, and cause the feathering, the beading, the color bleeding, and "mottling" which is uneven density of the ink droplet on the recording medium.

To overcome the problems, according to Patent Documents 1 through 3, such feathering and color bleeding are prevented by applying an ink treatment liquid (hereinafter referred to as an "image quality improvement treatment liquid") on a recording surface of the recording medium such as the high-quality paper or the coarse paper immediately before the ink droplets are ejected to the surface of the recording medium so that the applied ink droplets are fixed on the surface of the recording medium by the image quality improvement treatment liquid. Next, this prior-art technique is described in detail with reference to the accompanying drawings. As shown in FIG. 2A, when the high-quality paper or the coarse paper is used as the medium (sheet) 64, the image quality improvement treatment liquid 65 for fixing the color materials 62 of the ink droplets 63 is applied in advance on the surface of the medium (sheet) 64 to form an image quality improvement treatment liquid layer before the ink droplets 63 are applied (ejected) to the surface of the medium (sheet) so that a high-quality image is formed by the ink droplet 63 ejected onto the surface of the medium (sheet) 64. As shown in FIGS. 2B and 2C, when the ink droplet 63 is ejected onto the formed image quality improvement treatment liquid layer, the color materials 62 in the ink droplet 63 are agglutinated and fixed together so as not to penetrate along the directions of the pulp fibers of the medium (sheet) 64. As a result, the color materials 62 remain on the surface of the medium (sheet) 64 and on the other hand the vehicle liquid 61 penetrates into the medium (sheet) 64. This feature makes it possible to prevent the feathering, the color bleeding, the reduction of the density of an image, and the strike through of the image. Similarly, when a resin film is used as the medium (sheet) 64, the vehicle liquid 61 remains on the surface of the film but the color materials 62 can hardly be moved because the color materials 62 are likely to be agglutinated due to the image quality improvement treatment liquid 65, thereby enabling preventing the bleeding.

In order to make it possible to agglutinate the color materials 62 included in the ink droplet 63, it is necessary that the color materials 62 in the ink droplet 63 are negatively or positively charged by themselves. The dye itself is positively or negatively ionized in water. On the other hand, when a self-dispersion-type pigment is used as the pigment, the self-dispersion-type pigment itself is positively or negatively ionized in water. Further, when a pigment dispersion agent is used, the pigment dispersion agent is adsorbed onto the pigment and positively or negatively ionized in water. As a result, or equivalently, the pigment itself adsorbed by the pigment dispersion agent is positively or negatively ionized. Generally, the color materials are negatively charged and dispersed in the ink.

FIGS. 3A through 3C show a first principle of the operation of the image quality improvement treatment liquid. FIG. 3A shows the ink having water in which the color materials 62 are negatively ionized and dispersed. When the ink is in contact with the image quality improvement treatment liquid having acidity and including a large amount of protons (positive charges) as shown in FIG. 3B, the color materials 62 negatively ionized are electrostatically coupled with each other via the large amount of the protons in the image quality improvement treatment liquid so that the color materials 62 are agglutinated together as shown in FIG. 3C.

FIGS. 4A through 4C show a second principle of the operation of the image quality improvement treatment liquid. FIG. 4A shows the ink having water in which the color materials 62 are negatively ionized and dispersed. When the ink is in contact with the image quality improvement treatment liquid including cationic components indicating positive charges as shown in FIG. 4B, the color materials 62 negatively ionized are electrostatically coupled with each other via the cationic components in the image quality improvement treatment liquid so that the color materials 62 are agglutinated together as shown in FIG. 4C.

However, in order to apply the image quality improvement treatment liquid to the recording medium, a dedicated inkjet head for producing droplets of the image quality improvement treatment liquid has been used. Therefore, depending on a component included in the image quality improvement treatment liquid, the nozzle holes of the inkjet head may be clogged, which lacks reliability. Further, in order to successfully produce the ink droplets in the inkjet head, it may be necessary that a viscosity of the image quality improvement treatment liquid is as low as that of water, which limits the maximum viscosity of the image quality improvement treatment liquid. As a result of the limitation, there may be cases where, for example, even when there is an image quality improvement treatment liquid capable of effectively preventing ink bleeding but has a high viscosity, the image quality improvement treatment liquid may not be used, and it may not be possible to adequately increase the concentration of an image quality improvement treatment liquid so as to improve the image quality in printing. Therefore, the degree of freedom of treatment using the image quality improvement treatment liquid is limited, thereby making it difficult to use image quality improvement treatment liquid capable of remarkably preventing bleeding.

With the view of overcoming the above circumstances, Patent Document 4 proposes a technique in which the image quality improvement treatment liquid is applied to the printing surface of the recording medium (sheet) by using an application roller. According to this technique, it becomes possible to widen the range of the viscosity (i.e., increase the viscosity) of the image quality improvement treatment liquid and include various components capable of effectively improving the image quality with higher density in the image quality improvement treatment liquid.

On the other hand, it is also known that the less amount of image quality improvement treatment liquid applied to a medium such as a sheet becomes, the less the consumption amount of a fixing liquid in the image forming apparatus becomes. As a result, the cost in printing may be reduced and time for drying may be reduced so as to provide fast printing.

Patent Document 1: Japanese Patent Application Publication No. 2006-205465

Patent Document 2: Japanese Patent Application Publication No. 2001-301138

Patent Document 3: Japanese Patent Application Publication No. S64-9279

Patent Document 4: Japanese Patent Application Publication No. 2006-45522

However, there is a drawback. FIGS. 5A through 5C show a case where an image quality improvement treatment liquid 71 in a liquid state is simply applied to a surface of a medium (sheet) 72 such as high-quality paper by using an application roller 73. In this case, as described above, in order to reduce the amount of image quality improvement treatment liquid 71 to be applied to the surface of the medium (sheet) 72, it is necessary to reduce the thickness of the image quality improvement treatment liquid 71 formed on the surface of the application roller 73 (see FIG. 5A). Further, since the printing surface of the medium (sheet) 72 generally has convex sections and concave sections, the printing surface of the medium (sheet) 72 cannot be in full contact with the surface of the application roller 73 (see FIG. 5B). As a result, image quality improvement treatment liquid 71 having such a thin thickness cannot be fully applied to the printing surface of the medium (sheet) 72 (see FIG. 5C). More specifically, when it is assumed that 20 mg of the image quality improvement treatment liquid 71 is to be applied to the printing surface of an A4 sheet, it is necessary that the thickness of the image quality improvement treatment liquid 71 in a liquid state formed on the surface of the application roller 73 becomes about 0.32 μm (when transfer rate is assumed to be 100%). However, the height of the roughness of the printing surface of the high-quality paper is typically in a range from about 10 μm to about 20 μm. Therefore, in this case, it is not practically possible to uniformly apply the image quality improvement treatment liquid 71 in a liquid state to the surface of the medium (sheet) 72 by using the application roller 73. Further, when the image quality improvement treatment liquid 71 in a liquid state is applied to the printing surface of the medium (sheet) 72 using the application roller 73, in order to apply the image quality improvement treatment liquid 71 in a liquid state to the entire printing surface of the medium (sheet) 72, it may be difficult to reduce the amount of the image quality improvement treatment liquid 71 in a liquid state to be applied to the printing surface of the medium (sheet) 72 to about 100 mg or less per A4 sheet. As a result, the printed sheet may be curled or wrinkled; and the consumption amount of the image quality improvement treatment liquid 71 may be increased, thereby increasing the cost per printed sheet.

SUMMARY OF THE INVENTION

According to an aspect of the present invention, an image quality improvement treatment liquid is disclosed that may improve the quality of an image formed on a medium by reacting with color materials in ink so as to agglutinate the color materials together upon contact with the ink. The ink includes water and color materials to be ionized in water by themselves or color materials to be ionized in water by being absorbed with components having ionic characteristics in water. The image quality improvement treatment liquid includes at least one of cationic components and components capable of acidizing water, at least one of nonionic surfactant and amphoteric surfactant as a foaming agent, and water-insoluble fatty acid. By configuring in this way, it may become possible to prevent a medium (printed sheet) from being curled or being wrinkled and ink bleeding on the surface of the medium, thereby enabling forming an image with excellent cost performance.

Further, the amphoteric surfactant may include alkyl dimethyl amino acetic acid betaine having at least one of alkyl groups having 14, 16, and 18 carbons, or the amphoteric surfactant may include alkyl amide propyl betaine having at least one of alkyl groups having 14, 16, and 18 carbons. Further the amphoteric surfactant includes a mixture of the alkyl dimethyl amino acetic acid betaine and the alkyl amide propyl betaine, alkyl dimethyl amino acetic acid betaine having at least one of alkyl groups having 14, 16, and 18 carbons, and alkyl amide propyl betaine having at least one of alkyl groups having 14, 16, and 18 carbons. By configuring in this way, it may become possible to improve the foam stability of the image quality improvement treatment liquid while improving the foaming property.

Further, a hydrophilic group of the amphoteric surfactant may have a betaine structure including an amino group. By configuring in this way, it may become possible to easily generate bubbled image quality improvement treatment liquid because the foaming property is more likely to be maintained even when the image quality improvement treatment liquid is highly ionized, thereby improving the reliability of the image quality improvement treatment liquid upon being applied to the medium.

Further, the water-insoluble fatty acid may be one of myristic acid, palmitic acid, and stearic acid. By configuring in this way, it may become possible to remarkably improve the foam stability, thereby improving the reliability of the bubbling performance.

According to another aspect of the present invention, there is provided an image quality improvement processing method that includes bubbling the image quality improvement treatment liquid and applying the bubbled image quality improvement treatment liquid in advance to a surface of the medium. By configuring in this way, it may become possible to uniformly apply only a small amount of image quality improvement treatment liquid to the surface of the medium, thereby improving the reliability of the application of the image quality improvement treatment liquid to the surface of the medium and largely reducing the printing cost per unit square of the medium.

According to another aspect of the present invention, there is provided an image forming method including bubbling the image quality improvement treatment liquid, applying the bubbled image quality improvement treatment liquid in advance to a surface of a medium, and applying ink to the surface of the medium in accordance with image to be printed, the ink including water and color materials to be ionized in water or color materials to be ionized in water by being absorbed with components having ionic characteristics in water. By configuring in this way, it may become possible to prevent the media (printed sheet) from being curled or being wrinkled and ink bleeding on the surface of a medium, thereby enabling forming image with excellent cost performance.

According to another aspect of the present invention, there is provided an image forming apparatus including an image quality improvement treatment liquid bubbling unit configured to bubble the image quality improvement treatment liquid, a bubbled image quality improvement treatment liquid application unit configured to apply the bubbled image quality improvement treatment liquid to the surface of the medium in advance, and a recording unit configured to generate and apply ink droplets of the ink to the surface of the medium in accordance with image to be printed, the ink including water and color materials to be ionized in water or color materials to be ionized in water by being adsorbed with components having ionic characteristics in water. By configuring in this way, it may become possible to prevent the media (printed sheet) from being curled or being wrinkled and ink bleeding on the surface of a medium, thereby enabling forming image with excellent cost performance.

According to an embodiment of the present invention, it may become possible to prevent beading when ink droplets are ejected onto a medium such as a sheet or resin film and remarkably reduce the frequency of the feathering, the color bleeding, and the strike through of the image when ink droplets are ejected onto an uncoated sheet such as high-quality paper. Further, when compared with conventional apparatuses and methods, it may become possible to remarkably reduce the consumption amount of the image quality improvement treatment liquid. As a result, the sheet to which the image quality improvement treatment liquid is applied may be dried faster without being curled or being wrinkled. Further, the running cost may be reduced while high-quality image can be provided.

BRIEF DESCRIPTION OF THE DRAWINGS

Other objects, features, and advantages of the present invention will become more apparent from the following description when read in conjunction with the accompanying drawings, in which.

DETAILED DESCRIPTION OF THE PREFERRED EMBODIMENTS

First, a principle of the present invention is briefly described. According to an embodiment of the present invention, an image quality improvement treatment liquid to be bubbled is bubbled and the bubble density of the bubbled image quality improvement treatment liquid is reduced. By configuring in this way, it may become possible to increase the thickness of the bubbled image quality improvement treatment liquid applied to an application roller to ensure that the image quality improvement treatment liquid is applied to the entire printing surface of a sheet even though the printing surface of the sheet has convex sections and concave sections.

Figure 1B:
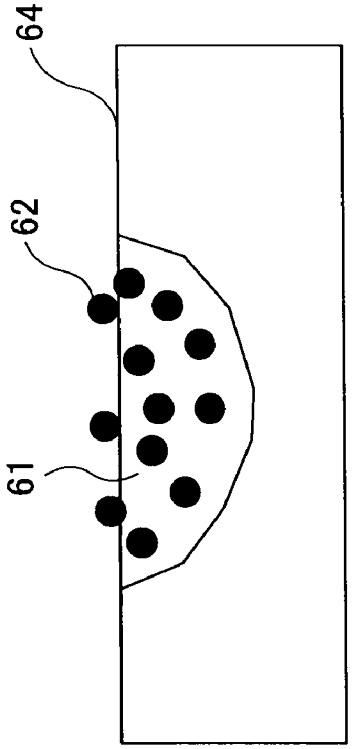
FIGS. 1A and 1B illustrate where an ink droplet ejected from an inkjet head is applied to a recording sheet.
Figure 1A:
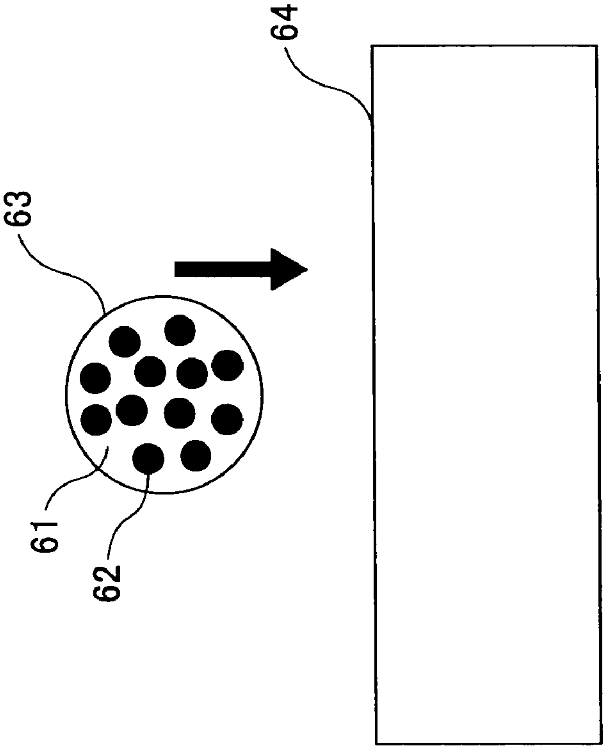
Figure 2A:
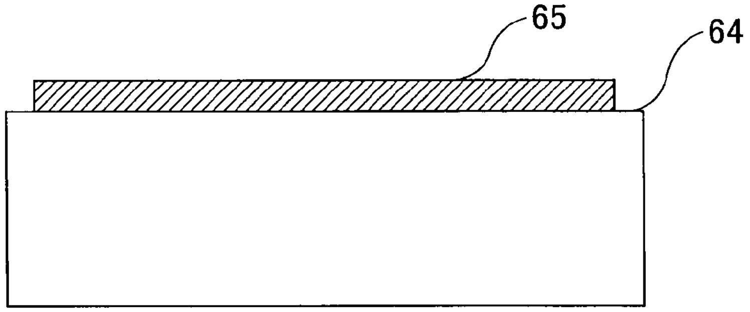
FIGS. 2A through 2C illustrate where the ink droplet ejected from the inkjet head to the recording sheet on which image quality improvement treatment liquid film is formed is applied.
Figure 2B:
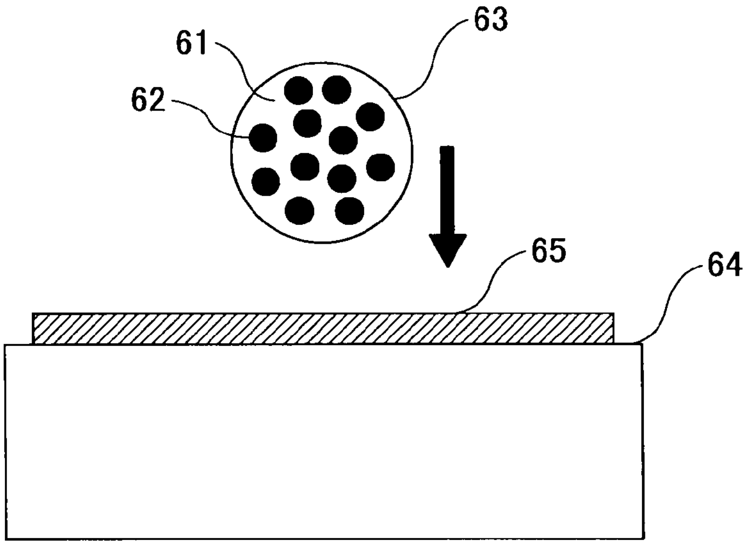
Figure 2C:
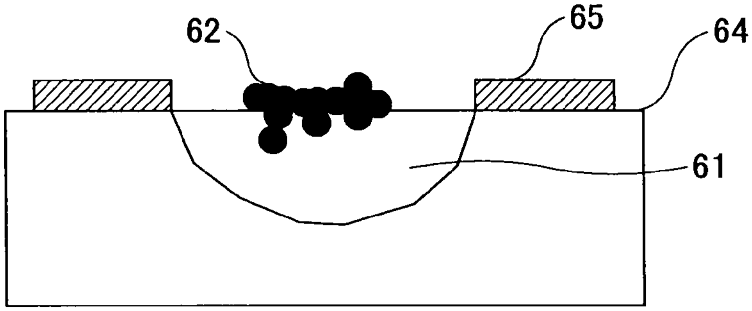
Figure 3A:
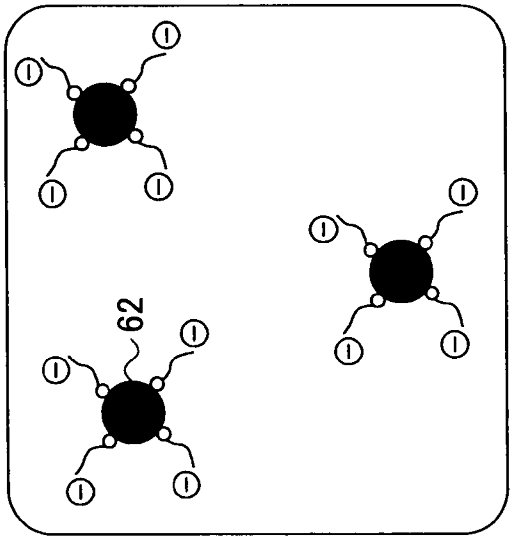
FIGS. 3A through 3C illustrate a first principle of the operation of the image quality improvement treatment process.
Figure 3B:
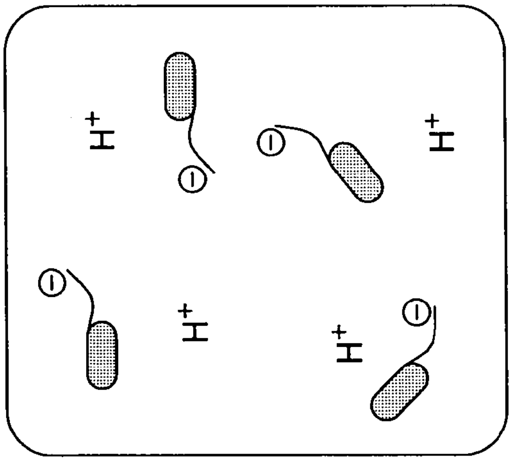
Figure 3C:
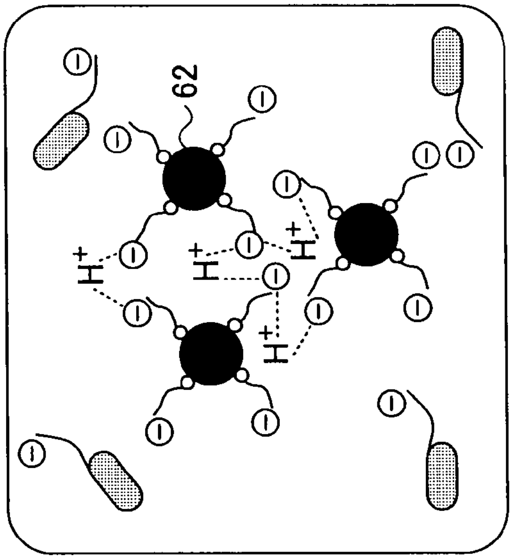
Figure 4A:
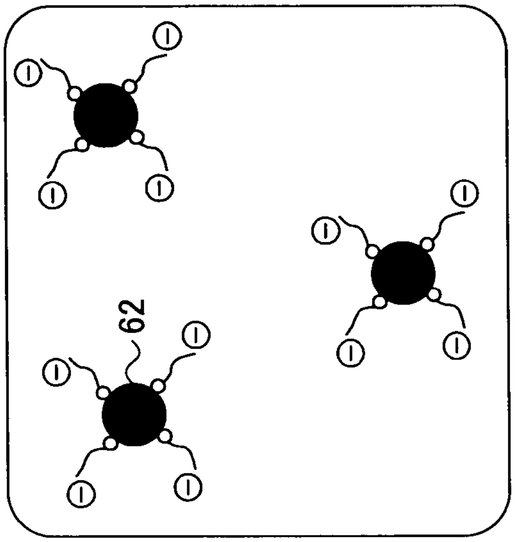
FIGS. 4A through 4C illustrate a second principle of the operation of the image quality improvement treatment process.
Figure 4B:
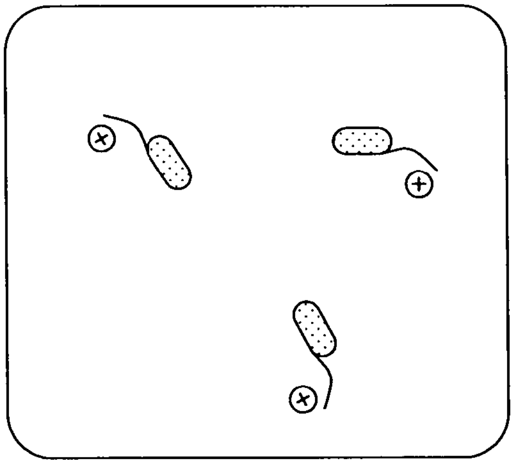
Figure 4C:
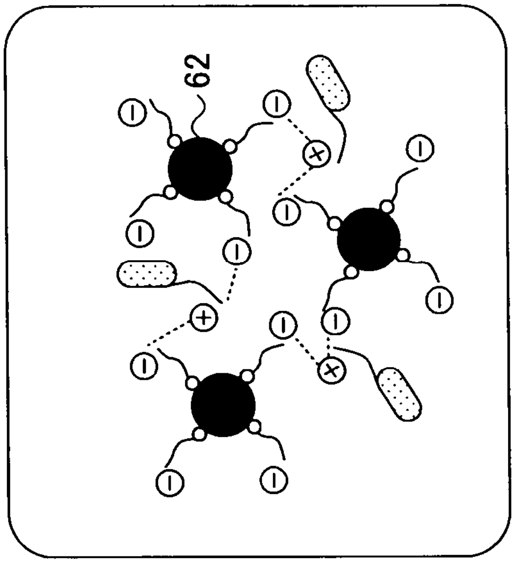
Figure 5A:
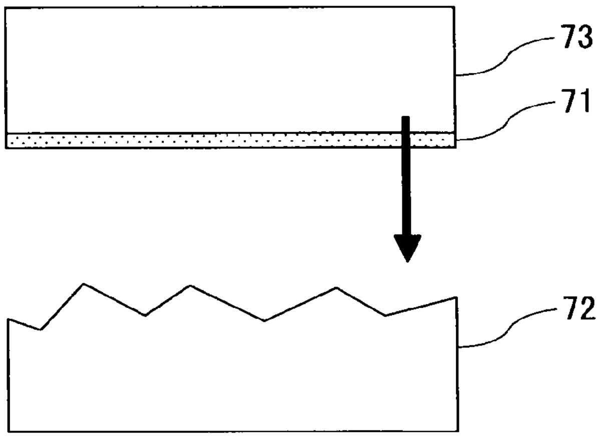
FIG.5A PRIOR ART
FIGS. 5A through 5C illustrate a case where the image quality improvement treatment liquid in a liquid state is applied to the printing surface of a recording sheet.
Figure 5B:
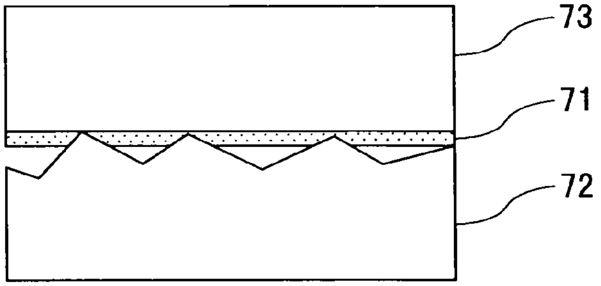
FIG.5B PRIOR ART
Figure 5C:
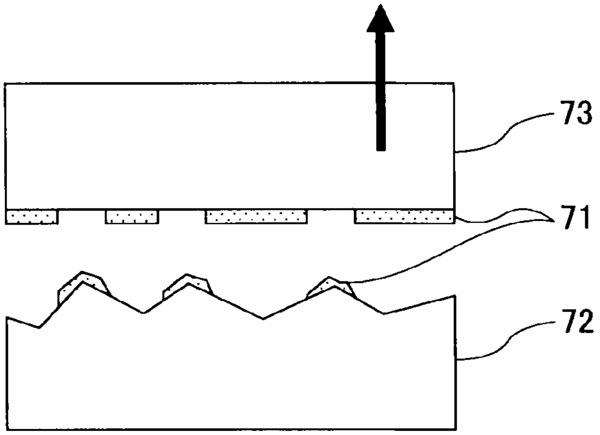
FIG.5C PRIOR ART
Figure 6A:
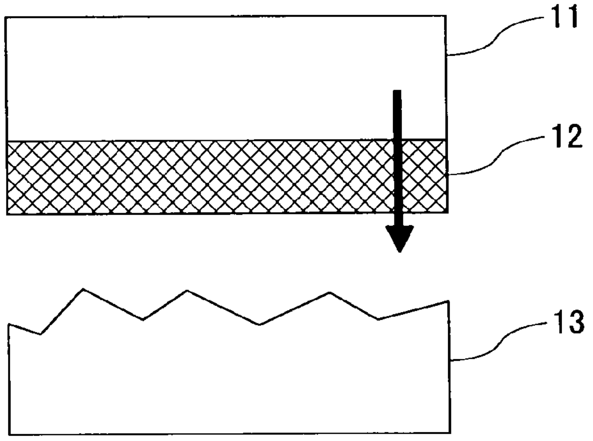
FIGS. 6A through 6D schematically illustrate where bubbled image quality improvement treatment liquid according to an embodiment of the present invention is applied to the entire printing surface of the recording sheet.
Figure 6B:
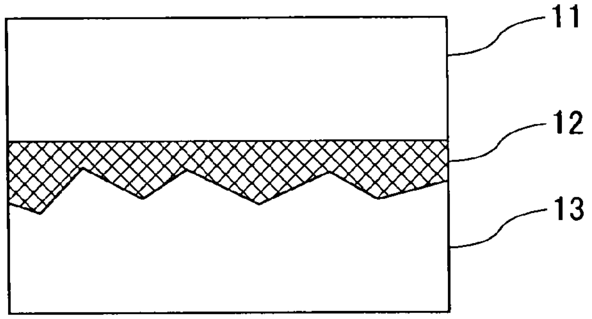
Figure 6C:
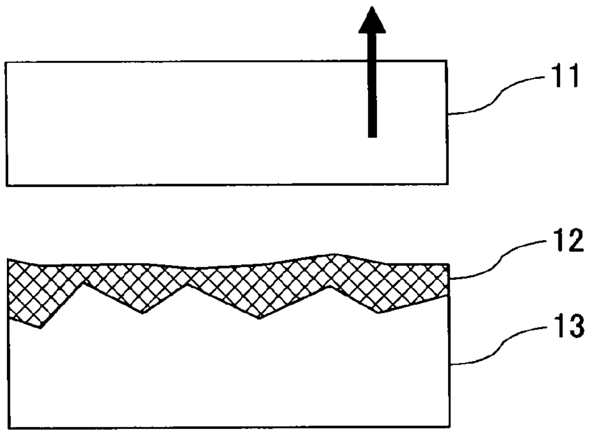
Figure 6D:
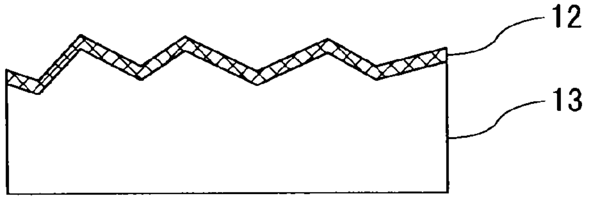

FIGS. 6A through 6D schematically illustrates where bubbled image quality improvement treatment liquid 12 applied to an application roller 11 is applied to the entire printing surface of a recording sheet 13. More specifically, FIG. 6A is a cross-sectional view showing where the image quality improvement treatment liquid 12 applied to the application roller 11 approaches to come into contact with the recording sheet 13. In this case, when the bubble density of the bubbled image quality improvement treatment liquid 12 applied to the surface of the application roller 11 is 0.01 g/$cm^3$ and the thickness of the of the bubbled image quality improvement treatment liquid 12 on the surface of the application roller 11 is 32 μm, the thickness of the bubbled image quality improvement treatment liquid 12 becomes greater than the maximum height of the roughness of the printing surface of the recording sheet 13 (see FIG. 6B). Therefore, it may become possible to cover the entire printing surface of the recording sheet 13 with the bubbled image quality improvement treatment liquid 12 (see FIG. 6C), and it may also become possible to reduce the amount of image quality improvement treatment liquid 12 to be applied to an A4-sized recording sheet 13 down to about 20 mg. Further, the applied bubbles of the image quality improvement treatment liquid 12 are broken so that the image quality improvement treatment liquid 12 can be uniformly and minimally applied to the entire printing surface of the recording sheet 13, the printing surface having convex sections and concave sections (see FIG. 6D).

Figure 7B:
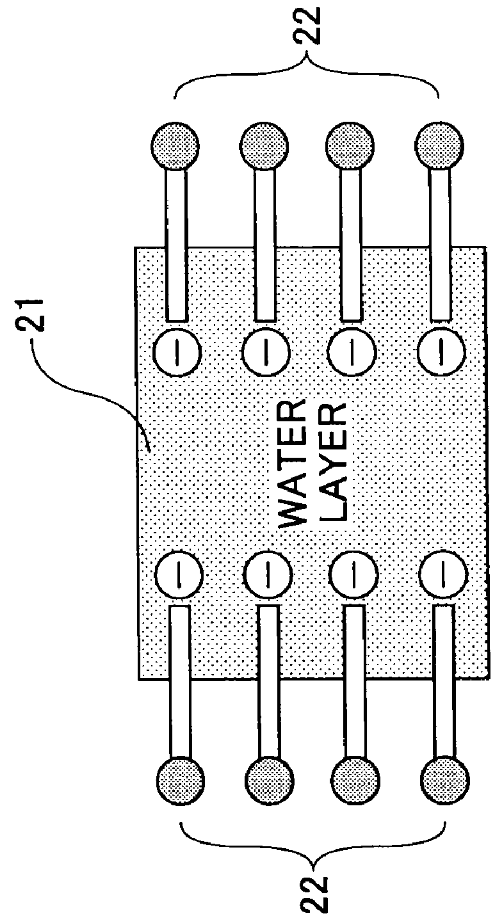
FIGS. 7A and 7B schematically show a bubble of the anionic surfactant.
Figure 7A:
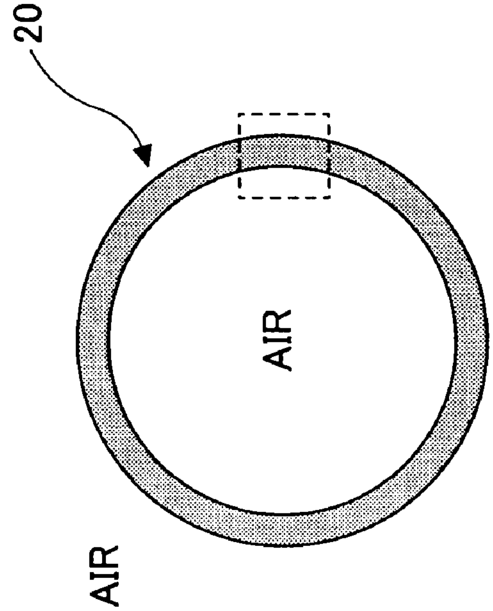

FIG. 7A schematically shows a bubble 20 of the anionic surfactant. In order to attain excellent foaming property and obtain bubbles having an excellent foam stability, anionic surfactant is generally used. FIG. 7B shows an enlarged cross-sectional view obtained by cutting the bubble film of the bubble 20 including the anionic surfactant along the dotted square in FIG. 7A. As shown in FIG. 7B, each molecule of the anionic surfactant 22 is arranged in a manner so that the negatively ionized end of the molecule of the anionic surfactant 22 is oriented to the center (inner side) of a water layer 21 as two opposite (double) orientations. Due to the double orientations of the anionic surfactant 22, the bubble film may have enough strength to sustain the bubble 20 without being broken. Further, other advantages of the anionic surfactant 22 may be to show strong orientation property due to binding between hydrophobic groups of the anionic surfactant 22 and to keep the thickness of the water layer 21 to its required level due to the electrostatic repulsive force between negatively ionized ends of two layers (oriented in the opposite directions with each other) of the anionic surfactant 22 facing across the center of the water layer 21 (see FIG. 7B).

Figure 8:
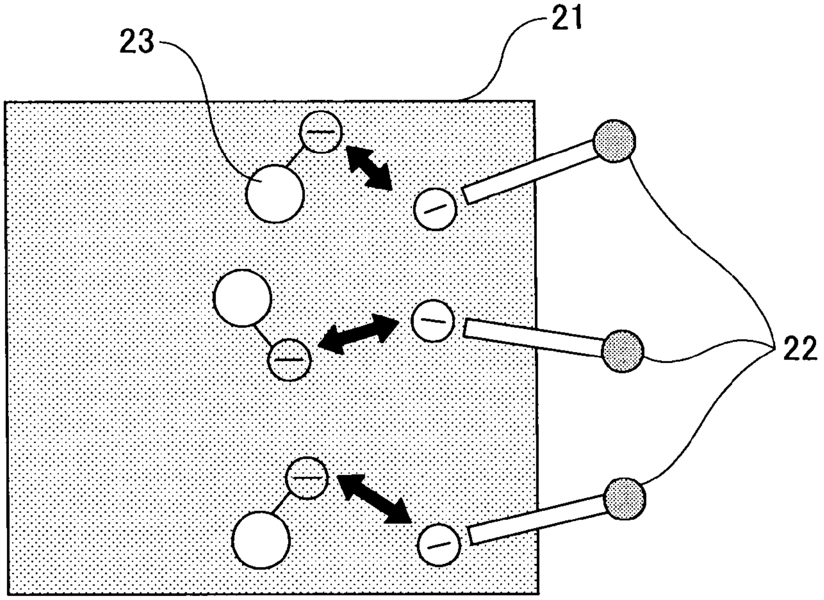
FIG. 8 schematically shows a behavior of the anionic surfactant in the bubble in the presence of a component having acidity (acidic component) in a water layer of the bubble.
Figure 9:
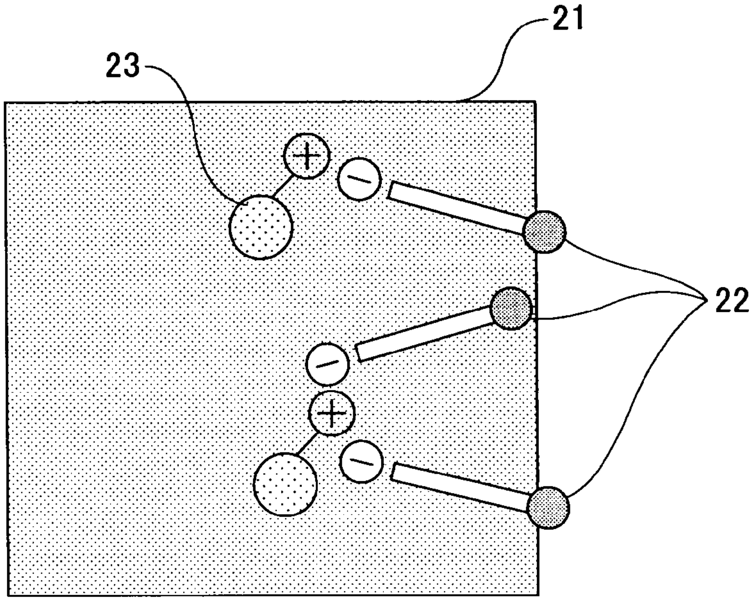
FIG. 9 schematically shows a behavior of the anionic surfactant in the bubble in the presence of cationic components in the water layer.

However, there exist an acidic component and a cationic component in the image quality improvement treatment liquid 12. FIG. 8 schematically shows a behavior of the anionic surfactant 22 in the bubble 20 in the presence of such an acidic component 23 in the water layer 21. As shown in FIG. 8, when the acidic component 23 exists in the water layer 21, a negatively ionized end of the acidic component 23 and the negatively ionized end of the anionic surfactant 22 are electrostatically repulsed from each other, thus the orientation of the anionic surfactant 22 may be disturbed, thereby preventing foaming or immediately breaking the bubbles even when it is foamed. Further, FIG. 9 schematically shows a behavior of the anionic surfactant 22 in the bubble 20 in the presence of the cationic component 24 in the water layer 21. As shown in FIG. 9, when the cationic component 24 exists in the water layer 21, a positively ionized end of the acidic component 23 and the negatively ionized end of the anionic surfactant 22 are electrostatically bonded to each other, thus the orientation of the anionic surfactant 22 may be disturbed. As a result, bubbling of the image quality improvement treatment liquid may be prevented or the bubbles of the image quality improvement treatment liquid may be immediately broken bubbles even when the bubbles are once generated. Due to such bubble likely to be immediately broken, i.e., due to the bubbles having a poor foam stability, it may become difficult to form a bubble film of the image quality improvement treatment liquid 12 on the application roller 11.

On the other hand, nonionic surfactant, amphoteric surfactant, and cationic surfactant do not show foam stability as good as that of anionic surfactant 22 and therefore produce only bubbles that are immediately broken. Therefore, in any method in which bubbles are produced simply by using surfactant conventionally used alone, the bubbles may not be produced as desired and the image quality improvement treatment liquid prepared has a poor foam stability. Therefore, it becomes difficult to produce adequately bubbled image quality improvement treatment liquid to be applied to the printing surface of the recording medium (sheet).

To overcome at least one of the above problems, according to an embodiment of the present invention, nonionic surfactant or amphoteric surfactant is used as a foaming agent, and water-insoluble fatty acid is included in the image quality improvement treatment liquid, so that the image quality improvement treatment liquid has an excellent foaming property and the produced bubbles have an excellent foam stability.

Figure 10:
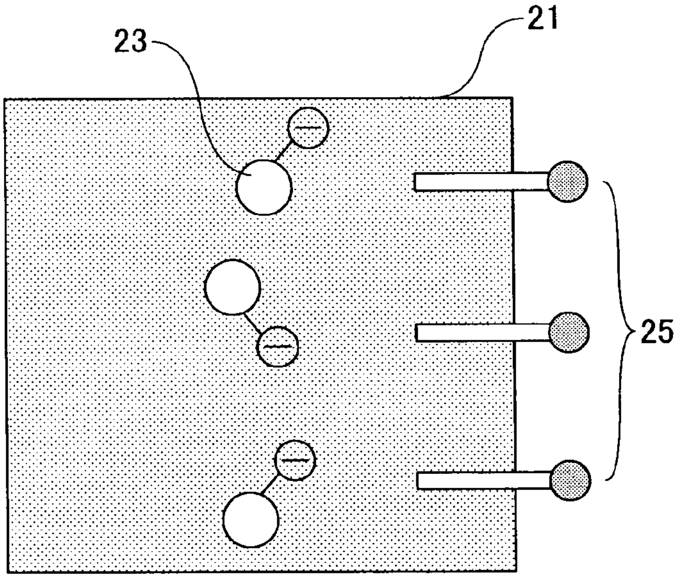
FIG. 10 schematically illustrates a case where nonionic surfactant is used as the foaming agent in the presence of an acidic component in the water layer of the bubble.

In the image quality improvement treatment liquid, there are so many components that are extremely highly ionized. Therefore, it is required that the hydrophilic group of the foaming agent for producing bubbles is to be kept electrostatically neutral or that the ionic characteristics of the hydrophilic group of the foaming agent is to be kept in an electrostatically neutral state or its current ionic characteristics, even in the presence of such extremely highly ionized components. To that end, nonionic surfactant is preferably used as the foaming agent because the hydrophilic group of the nonionic surfactant is electrostatically neutral. Further, amphoteric surfactant is also preferably used as the foaming agent because the amphoteric surfactant has cationic characteristics when the surrounding fluid has acidity and the amphoteric surfactant keeps its electrostatically neutral state or its current ionic characteristics even in the presence of ionized components. FIG. 10 schematically illustrates where nonionic surfactant 25 is used as the foaming agent in the presence of the acidic component 23 in the water layer 21 of the bubble 20. As shown in FIG. 10, the hydrophilic groups of the nonionic surfactant 25 are not ionized. Therefore, even in the presence of the acidic component 23, the orientation of the nonionic surfactant 25 is not disturbed. This principle is also applied to a case where the amphoteric surfactant is used.

However, as described in the paragraph concerning the advantages of the anionic surfactant, the thickness of the water layer 21 of the bubble 20 is kept to its required level by the electrostatic repulsive force between negatively ionized ends of two layers (oriented in the opposite directions with each other) facing across the center of the water layer 21 (see FIG. 7B). Therefore, when the nonionic surfactant or the amphoteric surfactant is used whose hydrophilic group is not electrostatically charged, it may become difficult to keep the thickness of the water layer 21 to its required level. Because of this feature, when the nonionic surfactant or the amphoteric surfactant is used to produce bubbles in the image quality improvement treatment liquid having extremely highly ionized components, the foaming property may be remarkably improved compared with a case where the conventional anionic surfactant is used. However, the foam stability remains unsatisfactory and therefore, it may not possible to uniformly and adequately apply the bubble film of the image quality improvement treatment liquid to the application roller.

Figure 11:
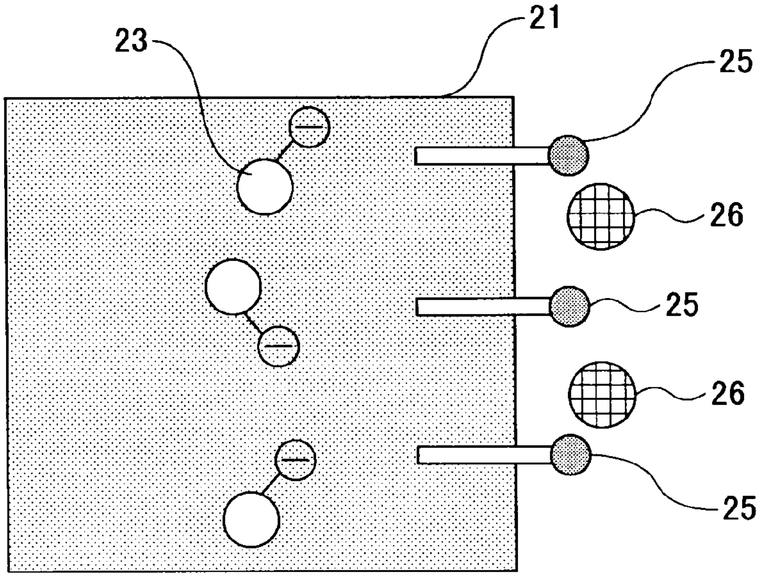
FIG. 11 illustrates where extremely minute fatty acid particles released in water attaches to the surface of the nonionic surfactant.

In order to compensate the above-described drawback of the foaming agent, according to an embodiment of the present invention, a small amount of water-insoluble fatty acid is added to the image quality improvement treatment liquid so as to remarkably improve the foam stability. As an example of the model of improving the foam stability, FIG. 11 illustrates where extremely minute fatty acid particles 26 released in water attaches to the surface of the nonionic surfactant 25, thereby reinforcing the structure (strength) of the water layer (bubble film) 21.

As described above, by using nonionic surfactant or amphoteric surfactant as a foaming agent with respect to extremely highly ionized image quality improvement treatment liquid, it may become possible to prepare the image quality improvement treatment liquid having an excellent foaming property. Further, at the same time, by adding the water-insoluble fatty acid to the image quality improvement treatment liquid, the foam stability of the bubbled foam may be remarkably improved.

Preferably, organic acid is used as the acid component in the image quality improvement treatment liquid. Namely, organic acid is to be preferably used in an image forming apparatus for homes and offices because generally organic acid is produced in a human body, included in food, and passes through the human body, and is scent-free. More specifically, succinic acid, citric acid, malic acid, tartaric acid, lactic acid and the like may be preferably used as the organic acid. Further, as the component having cationic characteristics in the image quality improvement treatment liquid according to an embodiment of the present invention, a polymer having at least one of primary through quaternary amine groups may be preferably used. Further, as the foaming agent for the image quality improvement treatment liquid, nonionic surfactant may be preferably used. More specifically, polyoxyethylene alkyl ethers, polyoxyethylene alkyl phenyl ethers, alkyl glycosides, fatty acid alkanolamides and the like may be preferably used as the foaming agent for the image quality improvement treatment liquid.

Further, as the foaming agent for the image quality improvement treatment liquid, amphoteric surfactants may also be preferably used. Among the amphoteric surfactants, amphoteric surfactants whose hydrophilic group has the betaine structure including an amino group may be more preferably used. particularly, an alkyl dimethyl amino acetic acid betaine structure as shown in formula 1 below is preferable.

$$R1\text{-}(CH_3)_2N—CH_2COOH \qquad \text{formula 1}$$

where "R1" denotes an alkyl group

Further more preferably, in the alkyl dimethyl amino acetic acid betaine structure shown in formula 1, the alkyl group "R1" is at least one of a myristyl group, palmityl group, and stearyl group having 14, 16, and 18 carbons.

Further, as the amphoteric surfactant whose hydrophilic group has the betaine structure including an amino group, an alkyl amide propyl betaine structure as shown in formula 2 below may be more preferable.

$$R2\text{-}CO—NH—(CH_2)_3—(CH_3)_2N—CH_2COOH \qquad \text{formula 2}$$

where "R2" denotes an alkyl group

Further more preferably, in this formula 2, the alkyl group "R2" is at least one of a myristyl group, palmityl group, and stearyl group having 14, 16, or 18 carbons.

Next, as the water-insoluble fatty acid added to the image quality improvement treatment liquid, preferably, the alkyl group has a long chain to some extent, and especially, myristic acid, palmitic acid, and stearic acid are capable of improving the foam stability of the image quality improvement treatment liquid.

Figure 12:
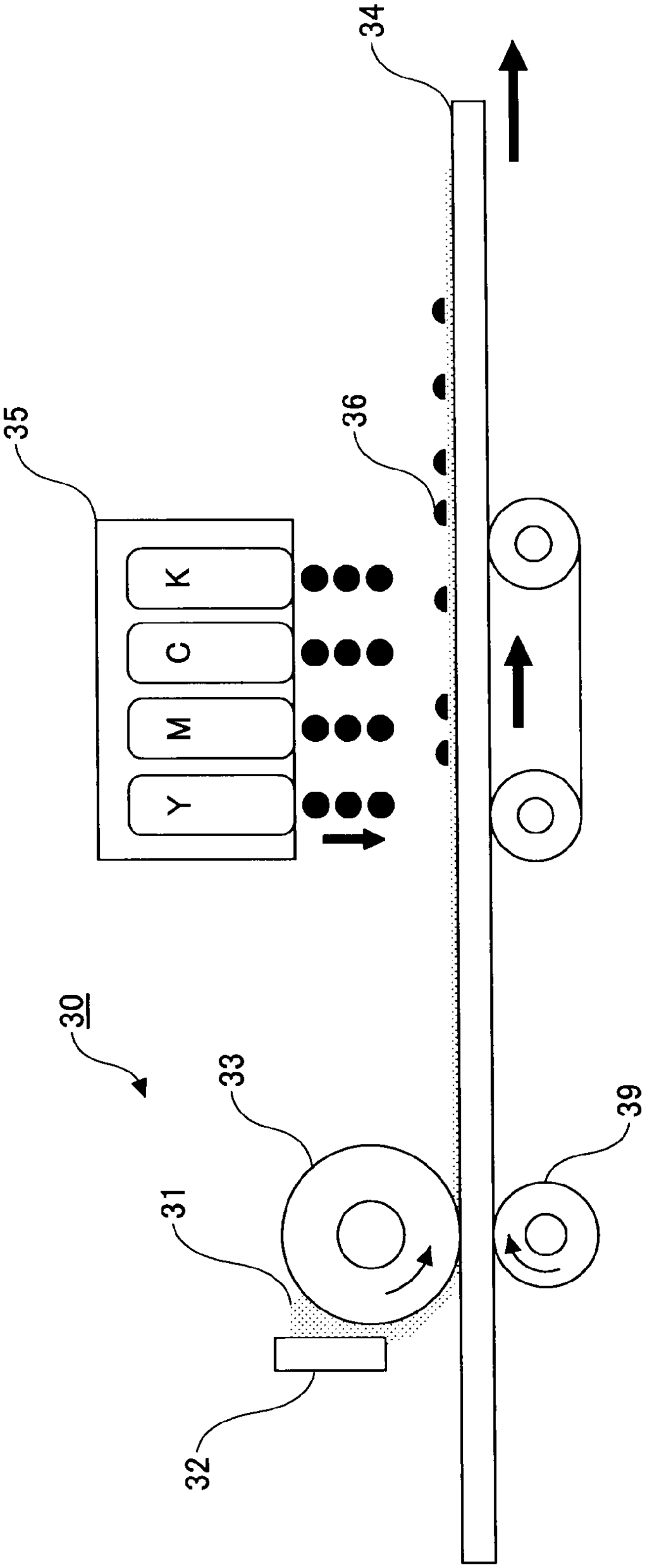
FIG. 12 schematically illustrates a configuration of bubbled image quality improvement treatment liquid application means.

FIG. 12 schematically illustrates a configuration of bubbled image quality improvement treatment liquid application means 30. As illustrated in FIG. 12, in the bubbled image quality improvement treatment liquid application means 30, the image quality improvement treatment liquid is bubbled and a small amount of the bubbled image quality improvement treatment liquid having a uniform thickness is applied to an application roller 33 by using a film thickness control blade 32. Then, the bubbled image quality improvement treatment liquid applied to the application roller 33 is applied (applied) in advance to a printing surface of a medium 34 such as a sheet or a resin film. After the application of the bubbled image quality improvement treatment liquid, ink droplets 36 of each color ejected from an inkjet head 35 are applied to the printing surface of the medium 34 in accordance with image information (image to be printed). The ink droplets 36 include water as a main component and color materials negatively or positively ionized in water. Particularly, the color materials negatively or positively ionized in water due to their carboxyl group or sulfo group may be preferably used. Further, as the medium 34, a sheet medium such as high-quality paper or a resin film such as a package film may be preferably used. Further, as the inkjet head 35, a pressure-on-demand type inkjet head using a piezoelectric component or film boiling as a pressure source may be preferably used. However, a charge control type inkjet head may also be used, and an electrostatic recording technique using an electrostatic mist may also be used.

Figure 13:
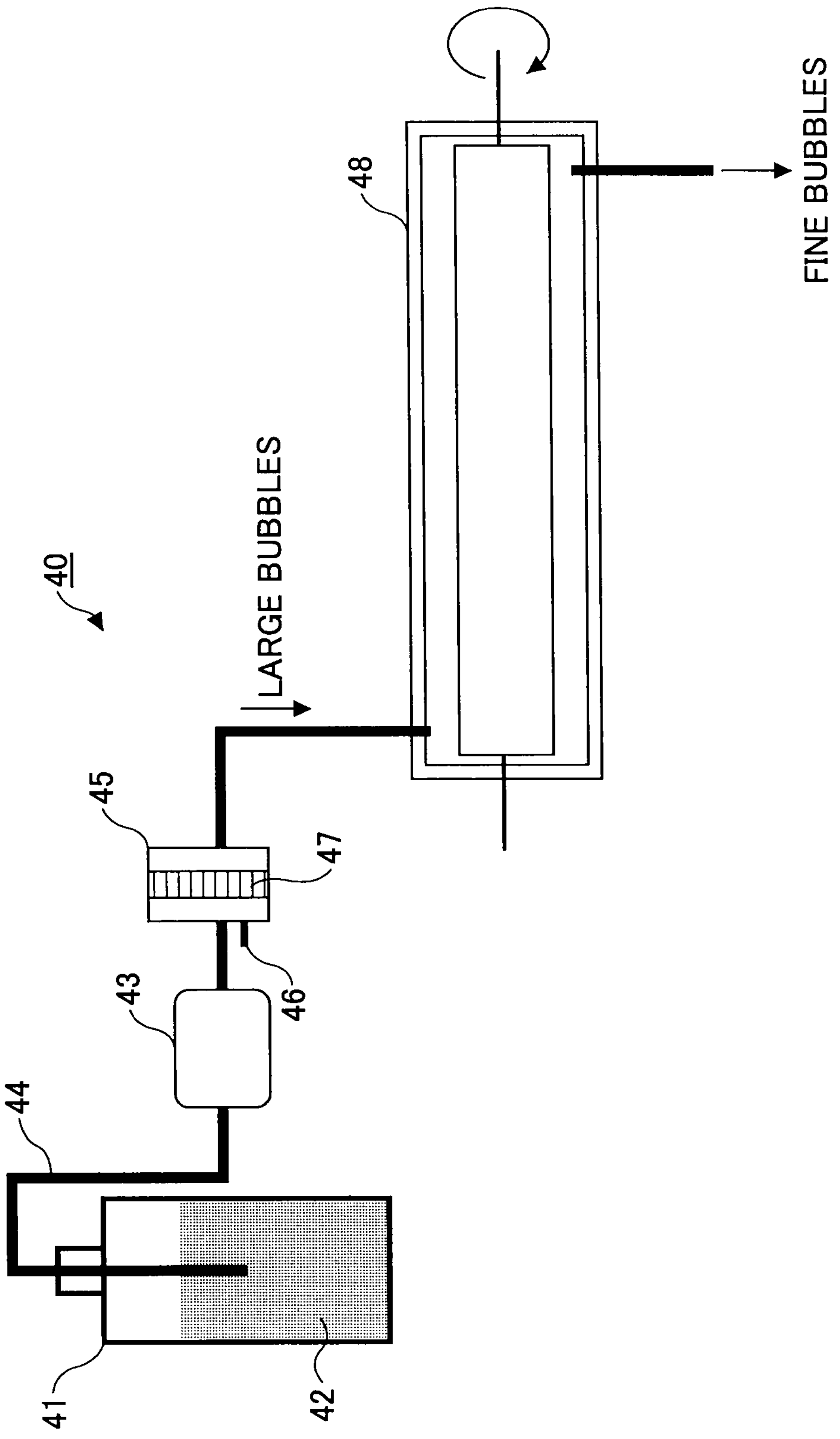
FIG. 13 schematically illustrates a configuration of bubbled image quality improvement treatment liquid generation means.

FIG. 13 schematically illustrates a configuration of bubbled image quality improvement treatment liquid generation means 40. As shown in FIG. 13, in the bubbled image quality improvement treatment liquid generation means 40, the image quality improvement treatment liquid 42 in a liquid state contained in an image quality improvement treatment liquid container 41 is supplied to an air-liquid mixing section 45 though a supply tube 44 by using a supply pump 43. The air-liquid mixing section 45 has an air inlet opening 46, through which air is introduced into the air-liquid mixing section 45 due to negative air pressure generated by the supply flow of the image quality improvement treatment liquid 42. The introduced air is mixed with the image quality improvement treatment liquid 42 in a liquid state, and the mixture of the air and the liquid is passed through a microporous sheet 47. By configuring in this way, it may become possible to generate bubbled image quality improvement treatment liquid 42 having substantially exclusively large bubbles having substantially uniform diameter. Further, such bubbled image quality improvement treatment liquid 42 may also be preferably obtained by, for example, stirring the mixture of the liquid 42 supplied by the supply pump 43 and air introduced through the air inlet opening 46 using a blade-type agitator so that air bubbles are injected into the fluid 42 to generate the large bubbles, or by bubbling the image quality improvement treatment liquid 42 in a liquid state supplied by the supply pump 43 by using an air supply pump or the like to generate the large bubbles. Then, the generated large bubbles are supplied into a rotation cylinder 48 subject to a shearing force to break the large bubbles into fine bubbles. By configuring in this way, it may become possible to generate bubbled image quality improvement treatment liquid having extremely low density substantially equal to or less than 0.05 $g/cm^3$.

Figure 14:
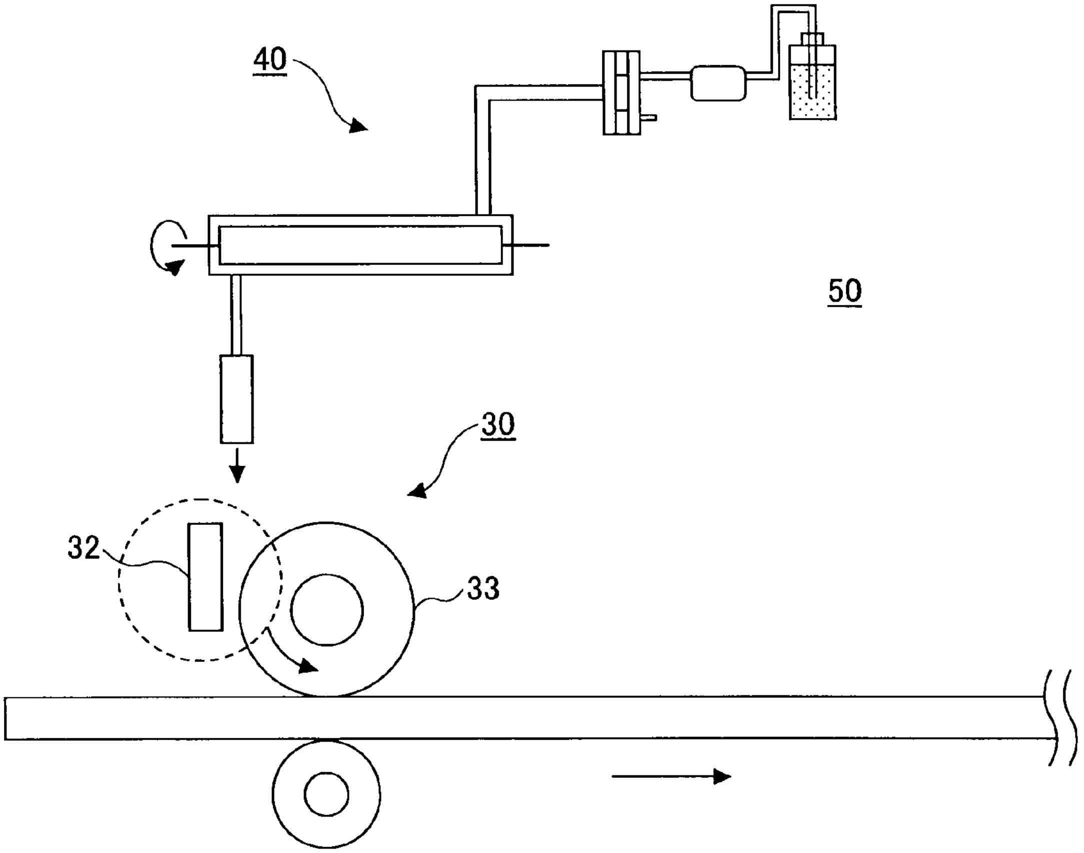
FIG. 14 schematically illustrates a configuration of a bubbled image quality improvement treatment liquid application apparatus.
Figure 15B:
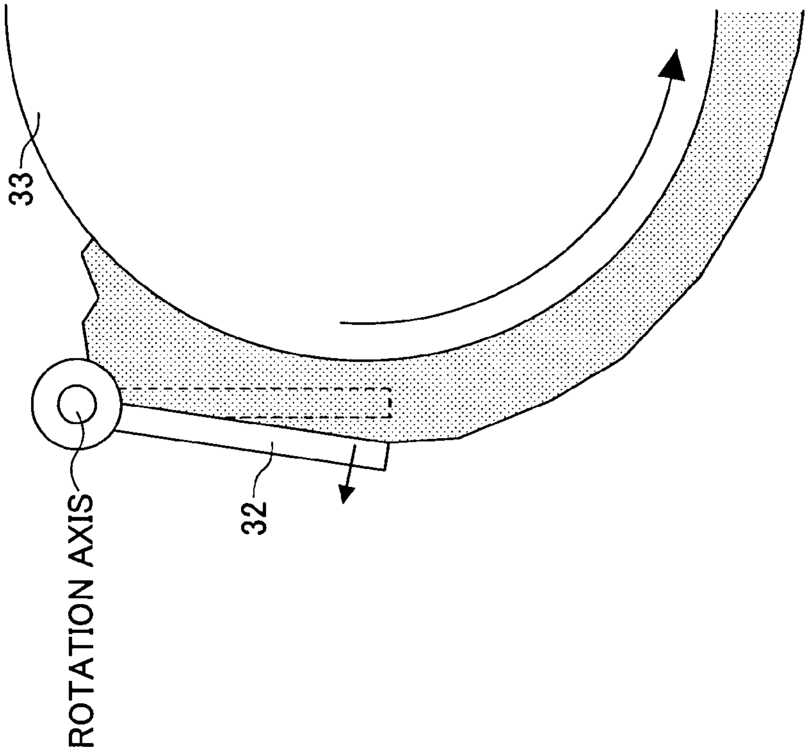
FIGS. 15A and 15B illustrate where the film thickness of the bubbled image quality improvement treatment liquid formed on the application roller is controlled by a film thickness control blade.
Figure 15A:
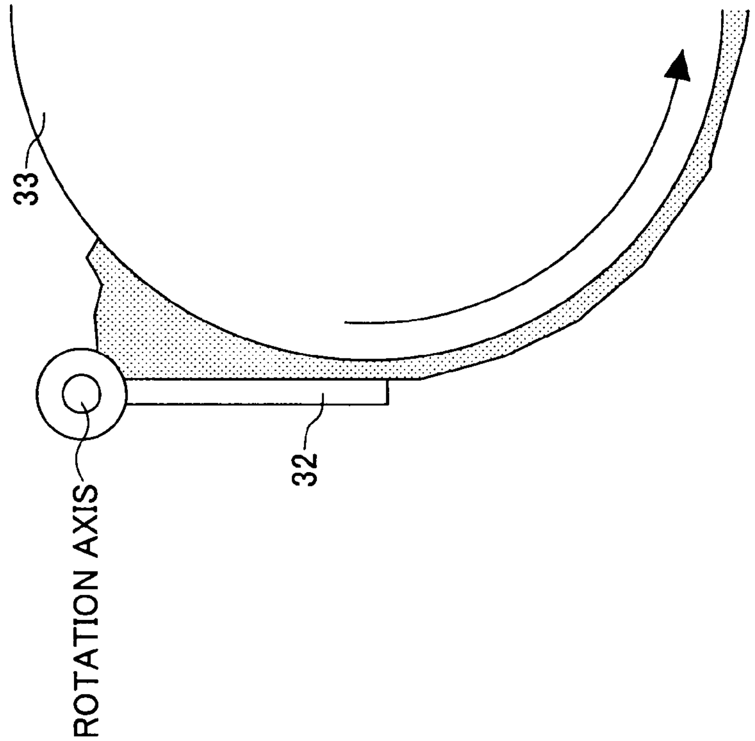
Figure 16:
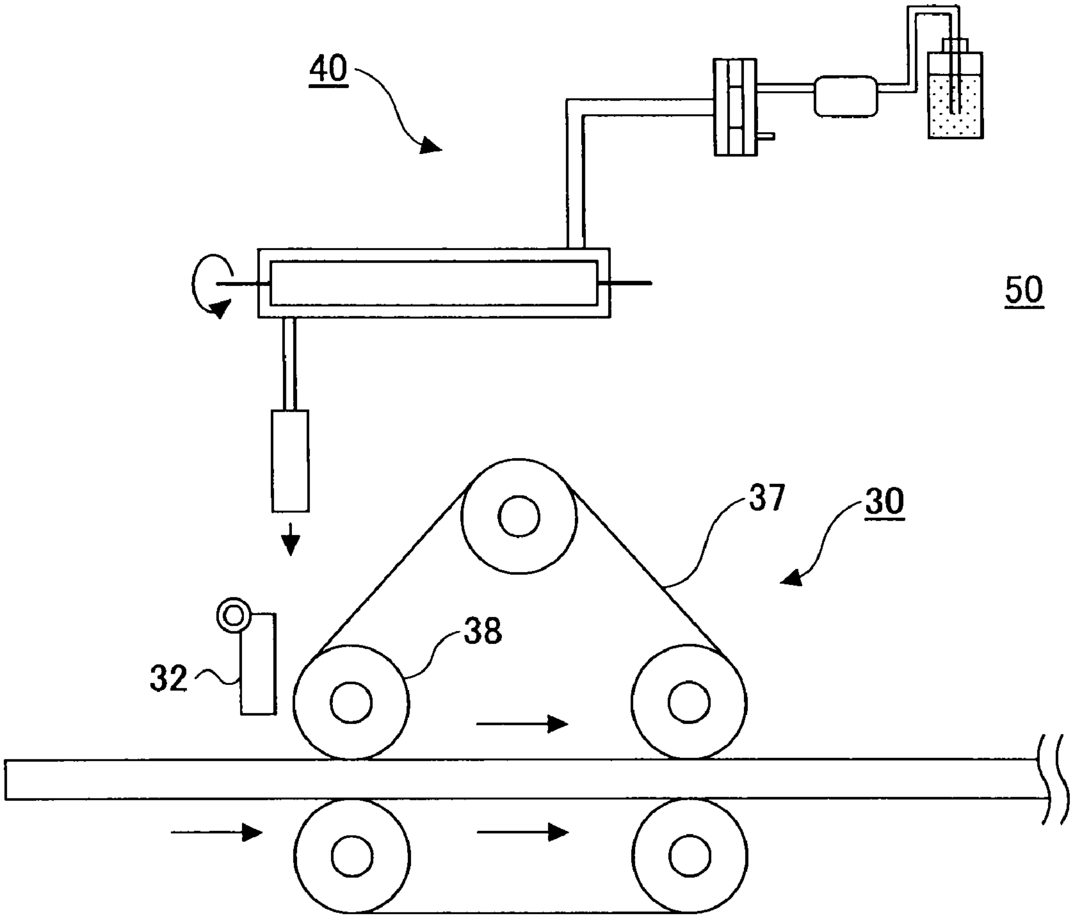
FIG. 16 shows another exemplary method of applying the bubbled image quality improvement treatment liquid to the recording sheet.

FIG. 14 schematically illustrates an exemplary configuration of bubbled image quality improvement treatment liquid application means 50. As shown in FIG. 14, the bubbled image quality improvement treatment liquid application means 50 is a combination of the bubbled image quality improvement treatment liquid application means 30 in FIG. 12 and the bubbled image quality improvement treatment liquid generation means 40 in FIG. 13. In this bubbled image quality improvement treatment liquid application means 50, it may become possible to uniformly apply an extremely small amount of the bubbled image quality improvement treatment liquid 42 to a printing surface of the recording sheet before ink droplets are ejected from an inkjet head onto the recording sheet. FIGS. 15A and 15B are enlarged views illustrating where the film thickness of the bubbled image quality improvement treatment liquid 42 to be applied to the application roller 33 is controlled by using the film thickness control blade 32. When a gap between the film thickness control blade 32 and the surface of the application roller 33 is reduced, the film thickness of the bubbled image quality improvement treatment liquid 42 applied to the application roller 33 is accordingly reduced. On the other hand, when the gap between the film thickness control blade 32 and the surface of the application roller 33 is increased, the film thickness of the bubbled image quality improvement treatment liquid 42 applied to the application roller 33 is accordingly increased. FIG. 16 shows another method of applying the bubbled image quality improvement treatment liquid 42 to the recording sheet. In this method, the film thickness control blade 32 for controlling the film thickness of the bubbled image quality improvement treatment liquid 42 is disposed at the region where the belt 37 is curved around the roller 38. Further, the water-insoluble fatty acid added to the image quality improvement treatment liquid 42 may be separated and allowed to float to the water surface when preserved for a long time. When this may be a problem, the water-insoluble fatty acid may be added to the image quality improvement treatment liquid 42, for example, immediately before the image quality improvement treatment liquid 42 is mixed with air.

Further, in the above description, a case is described where the image quality improvement treatment liquid is applied to a sheet or the like in advance in the image forming apparatus. However, the present invention is not limited to this configuration. For example, the present invention may be applied to, for example, a process of manufacturing sheets in which the bubbled image quality improvement treatment liquid is applied to the sheets.

In the following, samples corresponding to five (5) types of the image quality improvement treatment liquids and comparative samples corresponding to five (5) types of the image quality improvement treatment liquids were prepared and a comparative evaluation was made after an inkjet printing process was performed.

Sample 1

An image quality improvement treatment liquid as sample 1 was prepared as follows.

Preparation Method of Sample 1

Diluent solvent: ion-exchange water 45.8 wt %; Acidic component: lactic acid 30 wt %; Foaming agent: myristyl amidopropyl betaine (BISTA MAP by Matsumoto Yushi Seiyaku Co., Ltd) (fourteen (14) carbons in an alkyl group) 1 wt % and stearyl dimethyl aminoacetic acid betaine (AMPHITOL 86B by KAO Corporation) (eighteen (18) carbons in an alkyl group) 2 wt %; Water-insoluble fatty acid: myristic acid 0.2 wt %; Foam enhancer: coconut fatty acid diethanol amido (1:1) type (Marpon MM by Matsumoto Yushi Seiyaku Co., Ltd) 1 wt % and propylene glycol 20 wt %.

All the above materials were mixed in water to obtain a mixture. Then, the mixture was heated using hot water and slowly stirred at a temperature of 70° C. for 10 minutes to prepare the image quality improvement treatment liquid (sample 1).

Sample 2

An image quality improvement treatment liquid as sample 2 was prepared by the following method.

Preparation Method of Sample 2

Diluent solvent: ion-exchange water 45.9 wt %; Acidic component: lactic acid 30 wt %; Foaming agent: myristyl amidopropyl betaine (BISTA MAP by Matsumoto Yushi Seiyaku Co., Ltd) (fourteen (14) carbons in an alkyl group) 1 wt % and stearyl dimethyl amino acetic acid betaine (AMPHITOL 86B by KAO Corporation) (eighteen (18) carbons in an alkyl group) 2 wt %; Water-insoluble fatty acid: palmitic acid 0.1 wt %; Foam enhancer: coconut fatty acid diethanol amido (1:1) type (Marpon MM by Matsumoto Yushi Seiyaku Co., Ltd) 1 wt % and propylene glycol 20 wt %.

All the above materials were mixed in water to obtain a mixture. Then, the mixture was heated using hot water and slowly stirred at a temperature of 70° C. for 10 minutes to prepare the image quality improvement treatment liquid (sample 2).

Sample 3

An image quality improvement treatment liquid as sample 3 was prepared by the following method.

Preparation Method of Sample 3

Diluent solvent: ion-exchange water 45.9 wt %; Acidic component: lactic acid 30 wt %; Foaming agent: myristyl amidopropyl betaine (BISTA MAP by Matsumoto Yushi Seiyaku Co., Ltd) (fourteen (14) carbons in an alkyl group) 1 wt % and stearyl dimethyl aminoacetic acid betaine (AMPHITOL 86B by KAO Corporation) (eighteen (18) carbons in an alkyl group) 2 wt %; Water-insoluble fatty acid: stearic acid 0.1 wt %; Foam enhancer: coconut fatty acid diethanol amido (1:1) type (Marpon MM by Matsumoto Yushi Seiyaku Co., Ltd) 1 wt % and propylene glycol 20 wt %.

All the above materials were mixed in water to obtain a mixture. Then, the mixture was heated using hot water and slowly stirred at a temperature of 70° C. for 10 minutes to prepare the image quality improvement treatment liquid (sample 3).

Sample 4

An image quality improvement treatment liquid as sample 4 was prepared by the following method.

Preparation Method of Sample 4

Diluent solvent: ion-exchange water 45.8 wt %; Cationic component: dimethylamine/ammonia/epichlorohydrin polymer condensation (PAPYOGEN P105 by SENKA Corporation) 30 wt %; Foaming agent: myristyl amidopropyl betaine (BISTA MAP by Matsumoto Yushi Seiyaku Co., Ltd) (fourteen (14) carbons in an alkyl group) 1 wt % and stearyl dimethyl amino acetic acid betaine (AMPHITOL 86B by KAO Corporation) (eighteen (18) carbons in an alkyl group) 2 wt %; Water-insoluble fatty acid: myristic acid 0.2 wt %; Foam enhancer: coconut fatty acid diethanol amido (1:1) type (Marpon MM by Matsumoto Yushi Seiyaku Co., Ltd) 1 wt % and propylene glycol 20 wt %.

All the above materials were mixed in water to obtain a mixture. Then, the mixture was heated using hot water and slowly stirred at a temperature of 70° C. for 10 minutes to prepare the image quality improvement treatment liquid (sample 4).

Sample 5

An image quality improvement treatment liquid as sample 5 was prepared by the following method.

Preparation Method of Sample 5

Diluent solvent: ion-exchange water 61.8 wt %; Acidic component: lactic acid 30 wt %; Foaming agent: POE (12) lauryl ether (BT-12 Nikko Chemical Co., Ltd) 2 wt %; Water-insoluble fatty acid: myristic acid 0.2 wt %; Foam enhancer: coconut fatty acid diethanol amido (1:1) type (Marpon MM by Matsumoto Yushi Seiyaku Co., Ltd) 1 wt % and propylene glycol 5 wt %.

All the above materials were mixed in water to obtain a mixture. Then, the mixture was heated using hot water and slowly stirred at a temperature of 70° C. for 10 minutes to prepare the image quality improvement treatment liquid (sample 5).

Comparative Sample 1

An image quality improvement treatment liquid as comparative sample 1 was prepared by the following method.

Preparation Method of Comparative Sample 1

Diluent solvent: ion-exchange water 44.8 wt %; Acidic component: lactic acid 30 wt %; Foaming agent: sodium coconut oil fatty acid 4 wt %; Water-insoluble fatty acid: myristic acid 0.2 wt %; Foam enhancer: coconut fatty acid diethanol amido (1:1) type (Marpon MM by Matsumoto Yushi Seiyaku Co., Ltd) 1 wt % and propylene glycol 20 wt %.

All the above materials were mixed in water to obtain a mixture. Then, the mixture was heated using hot water and slowly stirred at a temperature of 70° C. for 10 minutes to prepare the image quality improvement treatment liquid (comparative sample 1).

Comparative Sample 2

An image quality improvement treatment liquid as comparative sample 2 was prepared by the following method.

Preparation Method of Comparative Sample 2

Diluent solvent: ion-exchange water 44.8 wt %; Cationic component: dimethylamine/ammonia/epichlorohydrin polymer condensation (PAPYOGEN P105 by SENKA Corporation) 30 wt %; Foaming agent: sodium coconut oil fatty acid 4 wt %; Water-insoluble fatty acid: myristic acid 0.2 wt %; Foam enhancer: coconut fatty acid diethanol amido (1:1) type (Marpon MM by Matsumoto Yushi Seiyaku Co., Ltd) 1 wt % and propylene glycol 20 wt %.

All the above materials were mixed in water to obtain a mixture. Then, the mixture was heated using hot water and slowly stirred at a temperature of 70° C. for 10 minutes to prepare the image quality improvement treatment liquid (comparative sample 2).

Comparative Sample 3

An image quality improvement treatment liquid as comparative sample 3 was prepared by the following method.

Preparation Method of Comparative Sample 3

Diluent solvent: ion-exchange water 46.0 wt %; Acidic component: lactic acid 30 wt %; Foaming agent: myristyl amidopropyl betaine (BISTA MAP by Matsumoto Yushi Seiyaku Co., Ltd) 1 wt % and stearyl dimethyl amino acetic acid betaine (AMPHITOL 86B by KAO Corporation) 2 wt %; Water-insoluble fatty acid: none Foam enhancer: coconut fatty acid diethanol amido (1:1) type (Marpon MM by Matsumoto Yushi Seiyaku Co., Ltd) 1 wt %; Foam enhancer: propylene glycol 20 wt %.

All the above materials were mixed in water to obtain a mixture. Then, the mixture was heated using hot water and slowly stirred at a temperature of 70° C. for 10 minutes to prepare the image quality improvement treatment liquid (comparative sample 3).

Comparative Sample 4

An image quality improvement treatment liquid as comparative sample 4 was prepared by the following method.

Preparation Method of Comparative Sample 4

Diluent solvent: ion-exchange water 46.0 wt %; Cationic component: dimethylamine/ammonia/epichlorohydrin polymer condensation (PAPYOGEN P105 by SENKA Corporation) 30 wt %; Foaming agent: myristyl amidopropyl betaine (BISTA MAP by Matsumoto Yushi Seiyaku Co., Ltd) 1 wt % and stearyl dimethyl amino acetic acid betaine (AMPHITOL 86B by KAO Corporation) 2 wt %; Water-insoluble fatty acid: none; Foam enhancer: coconut fatty acid diethanol amido (1:1) type (Marpon MM by Matsumoto Yushi Seiyaku Co., Ltd) 1 wt % and propylene glycol 20 wt %.

All the above materials were mixed in water to obtain a mixture. Then, the mixture was heated using hot water and slowly stirred at a temperature of 70° C. for 10 minutes to prepare the image quality improvement treatment liquid (comparative sample 4).

Comparative Sample 5

An image quality improvement treatment liquid as comparative sample 5 was prepared by the following method.

Preparation Method of Comparative Sample 5

Diluent solvent: ion-exchange water 44.8 wt %; Acidic component: lactic acid 30 wt %; Foaming agent: lauryl dimethyl amino acetic acid betaine (AMPHITOL 20B by KAO Corporation) (twelve (12) carbons in an alkyl group) 4 wt %; Water-insoluble fatty acid: myristic acid 0.2 wt %; Foam enhancer: coconut fatty acid diethanol amido (1:1) type (Marpon MM by Matsumoto Yushi Seiyaku Co., Ltd) 1 wt % and propylene glycol 20 wt %

All the above materials were mixed in water to obtain a mixture. Then, the mixture was heated using hot water and slowly stirred at a temperature of 70° C. for 10 minutes to prepare the image quality improvement treatment liquid (comparative sample 5).

Each of the samples 1 through 5 and comparative samples 1 through 5 was bubbled by using the bubbled image quality improvement treatment liquid generation device described below to prepare the corresponding bubbled image quality improvement treatment liquid.

Bubbled Image Quality Improvement Treatment Liquid Generation Device

The bubbled image quality improvement treatment liquid generation device includes a large bubble generating section, a fine bubble generating section, and an image quality improvement treatment liquid application means and ink droplet application means.

Large Bubble Generating Section

A large bubble generating section manufactured based on FIG. 13 includes:

an image quality improvement treatment liquid container (41): a bottle made of PET resin; a supply pump (43): a tube pump (45) (inner diameter: 2 mm, material of the tube: silicon rubber); a supply tube (44): silicon rubber tube (inner diameter 2 mm); and a microporous sheet (47) for generating large bubbles: mesh sheet made of stainless (#400) (opening: about 40 μm).

Fine Bubble Generating Section

A fine bubble generating section is manufactured based on FIG. 13.

The rotation cylinder 48 has a double-cylinder structure having an inner cylinder and outer cylinder. The axis of rotation of the inner cylinder is fixed and connected to a rotation drive motor (not shown) so that the inner cylinder rotates around the axis of rotation. Material of the inner cylinder and the outer cylinder is PET resin. The inner diameter and the length of the outer cylinder are 10 mm and 120 mm, respectively. The outer diameter and the length of the inner cylinder are 8 mm and 100 mm, respectively. The rotation speed of the inner cylinder varies in a range from 1,000 rpm to 2,000 rpm.

Image Quality Improvement Treatment Liquid Application Means (30) and Ink Droplet Application Means (35)

The Image quality improvement treatment liquid application means (30) and the ink droplet application means (35) are manufactured based on FIG. 12. The bubbled image quality improvement treatment liquid generated by the above fine bubble generating section is supplied to the gap between the film thickness control blade 32 and the application roller 33.

The application roller 33 is an SUS roller on which PFA resin is baking coated and has a diameter of 30 mm and a length of 320 mm.

A pressing roller 39 facing the application roller 33 includes a core bar and a sponge roller wound around the core bar. The core bar is made of aluminum alloy and has a diameter of 10 mm and a length of 320 mm. The sponge roller is made of polyurethane bubble material ("Color bubble EMO" by INOAC Corporation) having an outer diameter 50 mm.

The film thickness control blade 32 is made by attaching a plate glass (thickness: 1 mm, width 50 mm, height 20 mm) to a supporting plate made of aluminum alloy (thickness: 2 mm, width 50 mm, height 40 mm), so that the plate glass faces the application roller 33. Six (6) film thickness control blades 32 are aligned along the width direction of the application roller 33 and each of the film thickness control blades 32 is rotatably provided so as to rotate around a rotation axis shown in FIG. 15B so as to rotate by a corresponding driving mechanism (not shown), so that each of the film thickness control blades 32 can independently determine the corresponding gap between the glass surface of the film thickness control blades 32 and the application roller 33 in a range between from 10 μm to 100 μm.

Sheet feeding speed is 150 mm/s.

As the ink droplet application means (35), a commercially-available inkjet printer (GX 5000 by Ricoh) was used. In ink, anionic dispersant is adsorbed on the pigment to provide color materials negatively ionized in water. After the bubbled image quality improvement treatment liquid is applied to the printing surface of a sheet by using means described above, an image is immediately printed onto the sheet before the applied liquid is dried.

Table 1 below shows bubble density (g/cm$^3$) application amount of liquid (mg/A4 sized sheet), and printing result. As the printing medium (sheet), high-quality paper (PCC paper T-6200 by Ricoh) was used. The volume of the ink droplet was 20 pL.

TABLE 1

| | Bubble density (g/cm$^3$) | Amount of applied liquid to sheet (mg/A4-sized sheet) | Observed Curl or wrinkle of sheet ? |
|---|---|---|---|
| No process for liquid is done | — | — | Remarkably |
| Sample 1 | 0.020 | 60 | None |
| Sample 2 | 0.015 | 50 | None |
| Sample 3 | 0.019 | 40 | None |
| Sample 4 | 0.150 | 60 | None |
| Sample 5 | 0.020 | 60 | None |
| Comparative sample 1 | Not bubbled 1.20 | 1,200 | Remarkably |
| Comparative sample 2 | Not bubbled 1.20 | 1,200 | Remarkably |
| Comparative sample 3 | Bubbled but immediately broken 0.5 | 700 | Slightly |
| Comparative sample 4 | Not bubbled 1.10 | 1,100 | Remarkably |
| Comparative sample 5 | Bubbled but immediately broken 0.06 | 200 | Slightly |

As Table 1 shows, according to an embodiment of the present invention, by bubbling the image quality improvement treatment liquid, it may become possible to generate (prepare) an extremely-low-density image quality improvement treatment liquid. Further, by using the extremely-low-density image quality improvement treatment liquid, it may become possible to reduce an application amount of the image quality improvement treatment liquid down to 100 mg or less per A4-sized sheet. Further, it may become possible to obtain an image with higher printing density and lower density on a back side without generating a curl or a wrinkle when compared with a case where no processing such as bubbling is performed on the image quality improvement treatment liquid, thereby enabling obtaining an excellent image quality improvement treatment.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image quality improvement treatment liquid for improving quality of an image formed on a medium by reacting with color materials in ink and agglutinating the color materials upon contact with the ink including water and color materials to be ionized in water or color materials to be ionized in water due to absorption with components having ionic characteristics in water, the image quality improvement treatment liquid comprising:

at least one of cationic components and components capable of acidizing water;

at least one of nonionic surfactant and amphoteric surfactant as a foaming agent; and water-insoluble fatty acid.

2. The image quality improvement treatment liquid according to claim 1, wherein the amphoteric surfactant includes alkyl dimethyl amino acetic acid betaine having at least one of alkyl groups having 14, 16, and 18 carbons.

3. The image quality improvement treatment liquid according to claim 1, wherein the amphoteric surfactant includes alkyl amide propyl betaine having at least one of alkyl groups having 14, 16, and 18 carbons.

4. The image quality improvement treatment liquid according to claim 1, wherein the amphoteric surfactant includes a mixture of alkyl dimethyl amino acetic acid betaine and alkyl amide propyl betaine, the alkyl dimethyl amino acetic acid betaine having at least one of alkyl groups having 14, 16, and 18 carbons, and the alkyl amide propyl betaine having at least one of alkyl groups having 14, 16, and 18 carbons.

5. The image quality improvement treatment liquid according to claim 1, wherein a hydrophilic group of the amphoteric surfactant has a betaine structure including an amino group.

6. The image quality improvement treatment liquid according to claim 1, wherein the water-insoluble fatty acid is one of myristic acid, palmitic acid, and stearic acid.

7. An image quality improvement processing method comprising the steps of:

bubbling the image quality improvement treatment liquid according to claim 1; and applying the bubbled image quality improvement treatment liquid in advance to a surface of a medium.

8. An image forming method comprising the steps of:

bubbling the image quality improvement treatment liquid according to claim 1;

applying the bubbled image quality improvement treatment liquid in advance to a surface of a medium; and applying ink to the surface of the medium in accordance with image information, the ink including water and color materials to be ionized in water or color materials to be ionized in water due to absorption with components having ionic characteristics in water.

9. An image forming apparatus comprising:

an image quality improvement treatment liquid bubbling unit configured to bubble the image quality improvement treatment liquid according to claim 1;

a bubbled image quality improvement treatment liquid application unit configured to apply the bubbled image quality improvement treatment liquid to a surface of a medium in advance; and a recording unit configured to generate and apply ink droplets of ink to the surface of the medium in accordance with image information, the ink including water and color materials to be ionized in water or color materials to be ionized in water due to absorption with components having ionic characteristics in water.

* * * * *